Jan. 3, 1950 R. W. POINTER 2,493,024
DUAL BEAM VEHICLE SUSPENSION
Filed Nov. 28, 1945 3 Sheets-Sheet 1
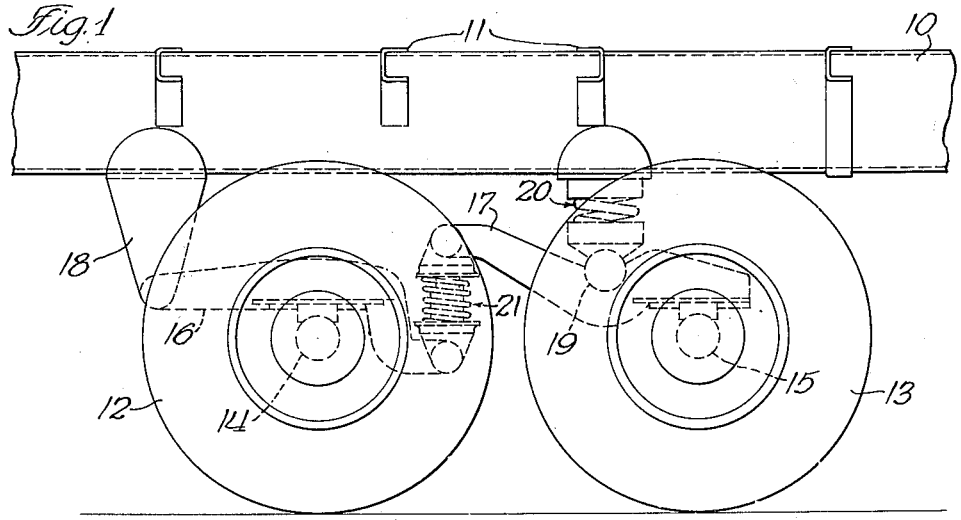
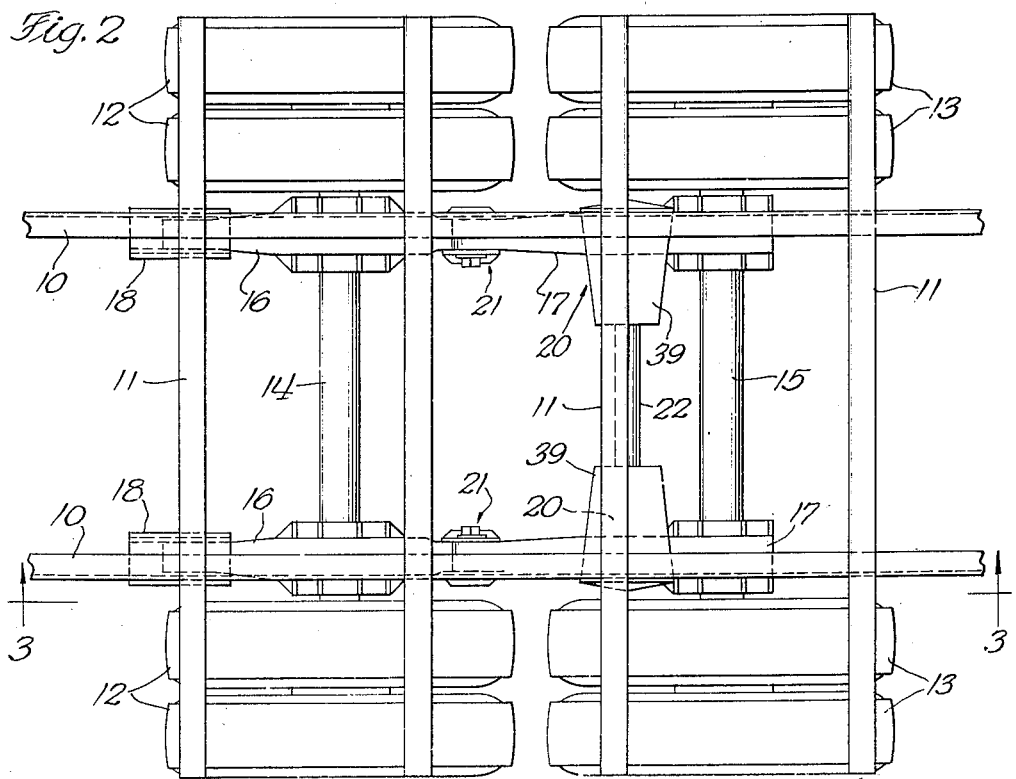
Robert W. Pointer
INVENTOR
BY Harold D. Cook
ATTORNEY Jan. 3, 1950     R. W. POINTER     2,493,024
DUAL BEAM VEHICLE SUSPENSION
Filed Nov. 28, 1945     3 Sheets-Sheet 2
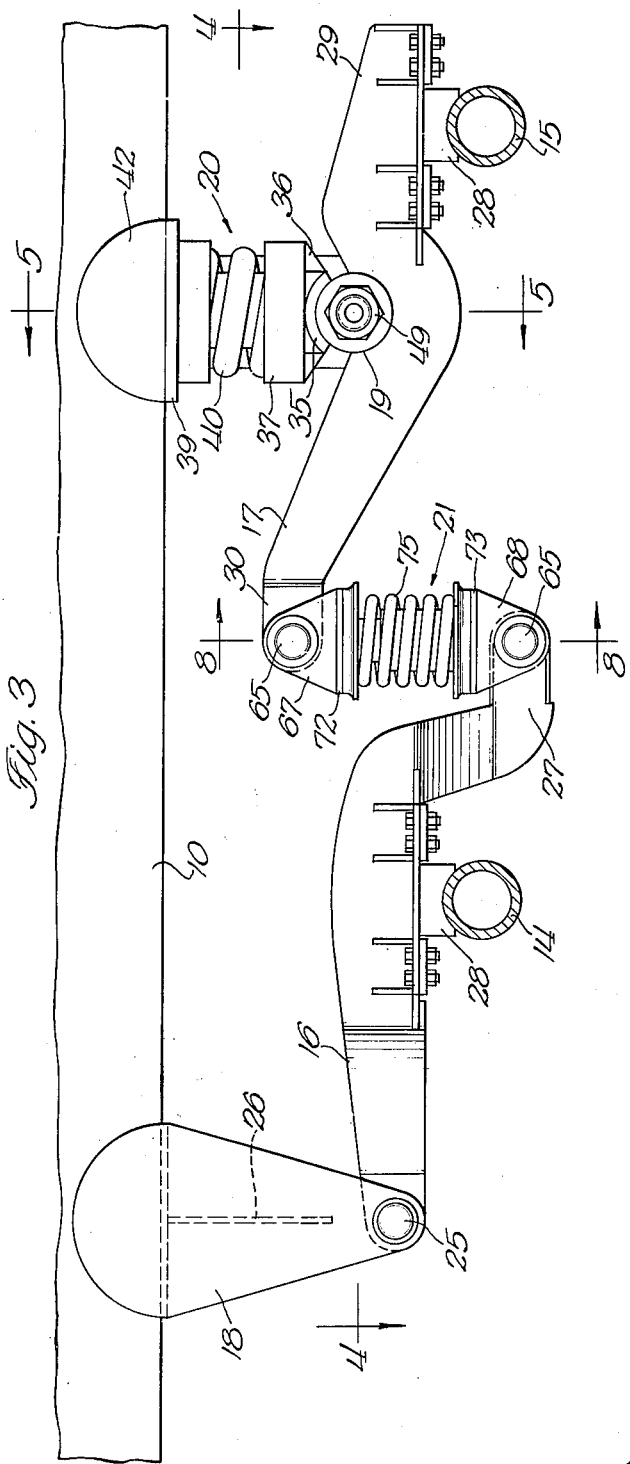
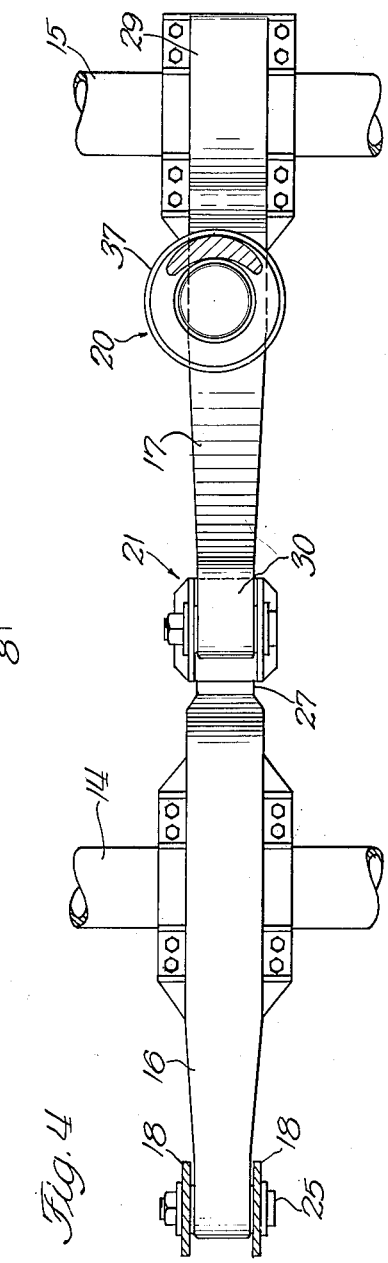
Robert W. Pointer
INVENTOR
BY Harold W. Cook
ATTORNEY

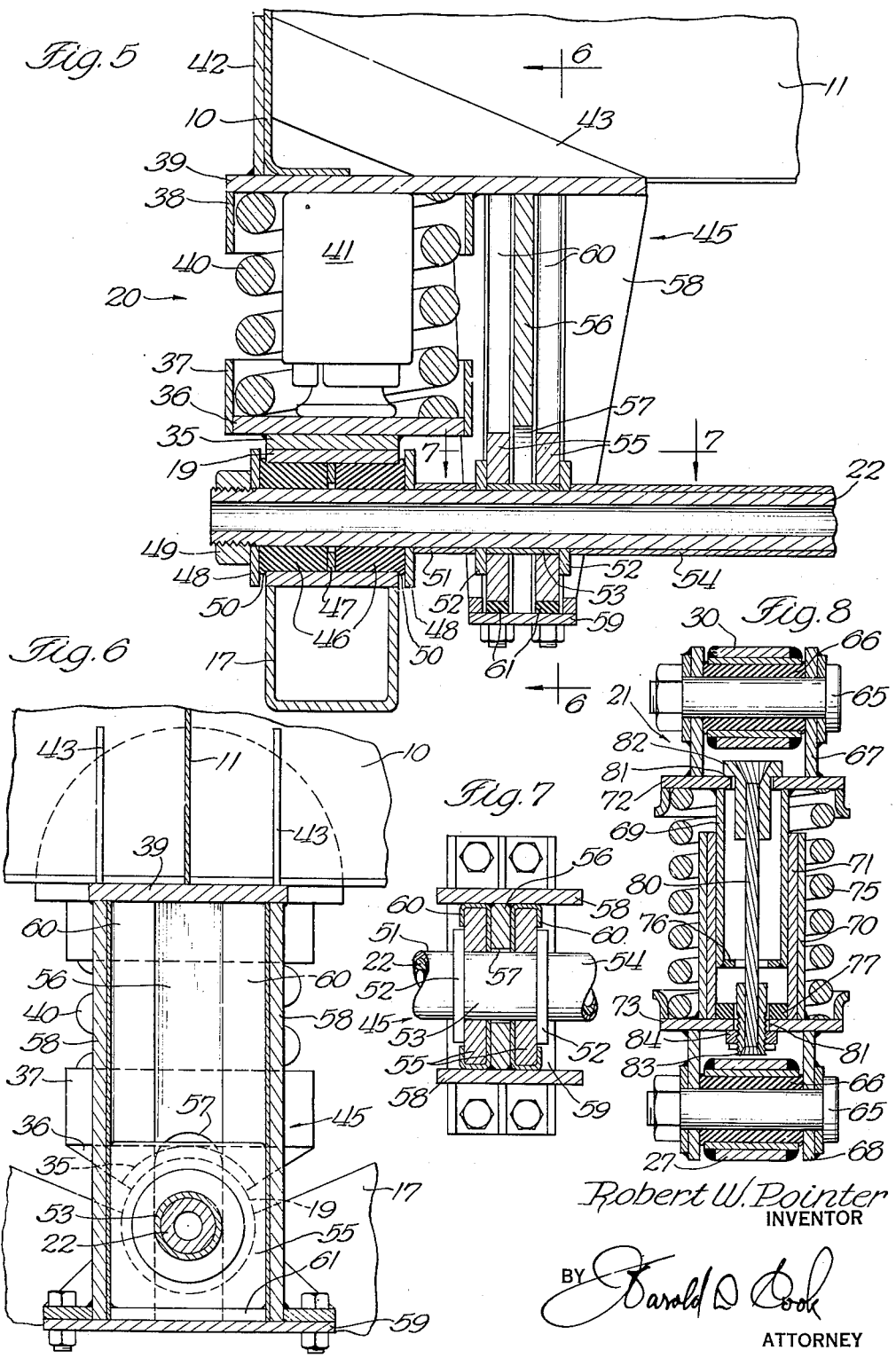

Patented Jan. 3, 1950

2,493,024

UNITED STATES PATENT OFFICE 2,493,024

DUAL BEAM VEHICLE SUSPENSION

Robert W. Pointer, Portland, Oreg.

Application November 28, 1945, Serial No. 631,292

15 Claims. (Cl. 280—104.5)

This invention relates to improvements in vehicle suspension, and has particular reference to a dual axle suspension wherein the axles are carried by interconnected dual beams pivotally mounted under the frame of the vehicle.

The present invention constitutes an improvement over the suspension disclosed and claimed in my prior patent for Suspension for multi-wheel vehicle, No. 2,361,496, issued October 31, 1944. In this patent the suspension comprises a pair of rigid beams which are pivotally attached directly to brackets on the vehicle frame for rocking movement only in a vertical plane. The beams each carry a cushion mounting for one of a pair of tandem axles. The beams have overlying end portions and are so arranged as regards their pivotal points that the overlying end portions of the beams are normally biased toward each other by the vehicle load. A compression element is arranged between adjacent end portions of the beams whereby road shocks of either axle are effectively adsorbed and a uniform distribution of load is maintained therebetween. Means are also provided loosely connecting the adjacent ends of the beams for positively limiting the amount of separation thereof without interfering with the cushioning effect of the compression element or the equalization of vehicle load. The compression element between the beam ends preferably comprises a coil spring or a block of rubber, and this element constitutes the principal spring member in the suspension system to absorb road shocks and the like, the pivotal attachments of the beams with the vehicle frame being without spring mountings.

The object of the present invention is to provide a dual beam, dual axle suspension of the general type above described which will have improved riding qualities and which, at the same time, will be rugged and economical to manufacture and maintain. One of the beams is pivotally mounted at one end on the vehicle frame in the manner described in my above mentioned prior patent, but the other beam is associated with a resilient assembly having improved riding qualities. The beam associated with this assembly is provided with a tubular trunnion in an intermediate portion of the beam capable of a rocking motion in an arcuate saddle bearing. The resilient assembly supports the major portion of the weight of the vehicle on the saddle bearing whereby the beam is allowed both rocking and vertical movements in a longitudinal vertical plane under the play of the combined action of the resilient assembly and resilient shackle to absorb road shocks without transmitting them to the vehicle.

The saddle bearing forms an integral part of a spring rider seating the lower end of a coil spring which constitutes the main load supporting spring. Within this spring and also seated on the spring rider is a shock absorber for controlling the spring action. The trunnion itself contains resilient bushings securing the ends of a transverse trunnion shaft interconnecting the beams on opposite sides of the vehicle. Rigid vertical guide boxes on opposite sides of the vehicle frame adjacent the trunnions receive guiding means on the trunnion shaft for maintaining the beams in proper position and alignment while permitting the necessary rocking and vertical movements in their respective vertical planes. Certain features of the trunnion mounting with its associated guide box and spring and shock absorber assembly are disclosed and claimed in my copending application for Letters Patent, Serial No. 632,550, filed December 3, 1945, for Resilient suspension for vehicles.

In the present invention the compression element between the adjacent beam ends functions as a resilient shackle to guide and constrain the movements of the beam ends to maintain the beams in a common longitudinal vertical plane. This compression element comprises telescoping tubular parts carrying a compression coil spring therearound and having shackle ends attached to the respective beams. Within the tubular parts are anchored the ends of a flexible cable to limit the separation of the ends of the two beams. Upon compression one of the telescoping parts bottoms on a resilient pad or cushion in the other part to provide a minimum limit of separation of the beam ends. When the axles are subjected to road shocks this compression coil spring serves as an auxiliary spring to permit interplay between the beams to absorb shocks which would otherwise be transmitted to the relatively stiff main load supporting spring on the trunnion. A novel feature of the present invention is the manner in which the two springs function together coordinately to absorb road shocks on both axles to provide a smoother ride for the vehicle.

The present invention also has certain features in common with the dual beam, dual axle vehicle suspension disclosed and claimed in my copending application, Serial No. 632,549, filed December 3, 1945, for Beam suspension for vehicles, but in the copending application the shackle connection between the beams is a tension shackle rather than a compression shackle and is of rigid unvarying length whereby road shocks from the leading axle are transmitted through the front and rear walking beams to the main spring and shock absorber assembly supporting the vehicle. In the present invention an entirely different mode of operation is achieved by permitting a relative interplay of the two walking beams through the resilient shackle connection to absorb a major portion of the road shock on the two axles individually before it is even transmitted to the main load supporting spring and shock absorber assembly. This is an important feature in the present construction, and provides greatly improved riding qualities.

These and other objects of the invention will become apparent to those skilled in the art as the description proceeds in connection with the accompanying drawings illustrating a preferred embodiment of the invention. Various changes may be made in the construction and arrangement of the parts, and all such modifications falling within the scope of the appended claims are included in the invention.

In the drawings:

Figure 1 is a fragmentary side elevation view of a vehicle frame having a dual axle suspension embodying the features of the present invention;

Figure 2 is a top plan view of the vehicle shown in Figure 1;

Figure 3 is an enlarged view of the suspension system taken on the line 3—3 of Figure 2;

Figure 4 is a view taken on the line 4—4 of Figure 3;

Figure 5 is a transverse sectional view through the trunnion and spring assembly taken on the line 5—5 of Figure 3;

Figure 6 is a view of the trunnion shaft guide box taken on the line 6—6 of Figure 5;

Figure 7 is a sectional view through the guide box taken on the line 7—7 of Figure 5; and Figure 8 is a sectional view through the resilient shackle, taken on the line 8—8 of Figure 3.

In Figures 1 and 2 the present suspension is applied to a vehicle frame comprising a pair of longitudinal members 10 and a plurality of cross members 11 constituting outriggers for supporting the floor and body of the vehicle. A plurality of road wheels 12 and 13 are carried by a pair of tandem axles 14 and 15 mounted on individual walking beams 16 and 17. For the purpose of the present description, the beam 16 will be referred to as the front walking beam and the beam 17 will be referred to as the rear walking beam, although it is to be understood that the vehicle will travel in either direction. The front end of the front beam 16 is pivotally connected to a bracket 18 on one of the longitudinal frame members 10, and the rear end is resiliently connected with the rear walking beam 17. The rear walking beam 17 is provided with a trunnion 19 for supporting a major portion of the weight of the vehicle on a spring and shock absorber assembly 20. By virtue of its trunnion and spring mounting, the rear beam 17 is capable of a rocking motion around the trunnion 19 as a center, while at the same time this center is capable of limited vertical movement under the action of the spring assembly 20.

The two beams are shaped and arranged so that the front end of the rear beam is disposed vertically above the rear end of the front beam, and interconnecting these two ends is a vertical compression member comprising a resilient shackle 21. The lever arms of the two beams are so proportioned that the upward force exerted on the shackle 21 by the front walking beam is exactly balanced by the downward force exerted thereon by the rear walking beam. On a smooth rolling surface the weight of the vehicle is distributed to produce equal loading on the axles 14 and 15, but the spring and shock absorber assembly 20 carries several times the weight supported by either the front bracket 18 or the shackle 21 individually. The spring and shock absorber 20 thereby functions as the main load supporting spring for the vehicle, but the resilient shackle 21 functions as an auxiliary spring to cushion road shocks which would otherwise be transmitted through the trunnion 19 to the relatively stiff spring 20. The compression member or shackle 21, being lightly loaded, is therefore provided with a relatively light spring surrounding telescoping parts which are arranged to bottom on a pad or cushion element under heavy impact load. When the wheels 12 and 13 on the two axles are subjected to road shocks individually, an interplay of the beams through the resilient shackle 21 is effective to absorb a considerable proportion of the road shock even before it is transmitted to the spring and shock absorber assembly 20, and without raising or lowering the height of the trunnion 19. It will also be observed that the linkage between the two beams is such as to neutralize and balance torque reaction from the axles 14 and 15 from either driving or braking torques applied to the wheels. In this way objectionable kick-up of the rear axle is avoided on quick stops, and all the wheels maintain their predetermined weight distribution on the ground regardless of operating conditions.

Resiliently interconnecting the trunnions 19 on opposite sides of the vehicle is a trunnion guide shaft 22 which is received near each end in vertical guide boxes to maintain the rear walking beams in their correct positions and alignments beneath the vehicle frame while at the same time permitting vertical and rocking movements under the combined spring action. The various features of construction hereinabove mentioned will now be described with reference to the several enlarged views on the drawings pertaining to those details.

The general arrangement of the walking beam linkage is best shown in Figure 3, reference being made to the various sectional views related thereto to show the details of construction of various associated parts and assemblies. The front bracket 18 is designed for attachment to a longitudinal frame member 10 of conventional channel shape, but this bracket and all other frame connections may readily be adapted to any other type of vehicle frame. The lower end of the bracket 18 comprises a pair of spaced ears carrying a pin 25 in a rubber bushing received in a tube or sleeve in the front end of the walking beam 16, a stiffening web 26 being provided to prevent lateral twisting of the pin under the various stresses imposed thereon by the walking beam. The intermediate portion of the walking beam 16 houses a resilient cushion mounting for the axle 14, and the rear end of the walking beam is vertically offset to provide a free end 27 slightly below the axle level, this shape being obtained by welding together steel plates to form a sturdy, light weight hollow box construction.

Both axles 14 and 15 are provided with cushion mounts in their respective beams, the particular details of these mounts forming no part of the present invention. A preferred form of axle cushion mounting, however, is shown in my prior Patent No. 2,238,002, issued April 8, 1941, for Cushion seat for trailer axles. In accordance with this patented construction, each axle support comprises a T block 28 integrally welded to the axle beam. The walking beam contains a box-like recess in which the upper end of the T block is completely surrounded on all sides by resilient rubber blocks. Such mountings possess resilience to allow the axles to shift or twist under the impact of road shocks and to permit a certain amount of self-steering of the axles upon curves, but constantly exert a restoring force to maintain the axles in their proper positions and alignments under the vehicle.

The rear beam 17 is also of hollow box construction having the tubular steel trunnion 19 integrally welded into the upper side of the beam intermediate its ends to form a cylindrical supporting surface having an arcuate extent somewhat less than 180°. The rear end 29 of the beam is slightly raised to accommodate a cushion mounting for the axle 15 so that this axle will be on the same level with the axle 14. The beam is raised to a greater extent at its front end 30 so that this end will be disposed vertically above the rear end 27 of the front beam and separated therefrom sufficiently to provide space for the resilient shackle 21. The details of construction of the shackle are described subsequently with reference to Figure 8 of the drawings.

Resting loosely on the tubular trunnion 19 is an arcuate saddle bearing 35 forming an integral part of a spring rider 36. The saddle 35 has a bearing surface of about 90° arcuate extent in contact with the trunnion so as to allow for considerable rocking movement of the walking beam in the saddle. The rider 36 constitutes a spring seat and is surrounded by a cupped wall 37 constituting a spring retainer vertically beneath a similar spring retainer 38 on an upper spring base plate 39. Interposed between the spring rider 36 and the spring base plate 39 are the main load supporting coil spring 40 and a shock absorber mechanism 41. The details of the shock absorber mechanism form no part of the present invention, a preferred form being shown in the patent to Dath No. 2,373,813, issued April 17, 1945. The spring base plate 39 constitutes one element of a mounting bracket so arranged that the spring and shock absorber assembly are brought to bear as nearly as possible vertically under the longitudinal frame channel 10. In the present embodiment the center of support of this assembly is slightly inside the channel 10 but is positioned directly under one of the cross members 11. Other parts of this mounting and supporting bracket comprise a vertical plate 42 adapted to lie flat against the longitudinal frame member 10 and be welded thereto, and a buttress plate 43 transversely parallel with said cross members 11 to provide additional support for the inner side of the spring base plate 39. Such additional support and bracing is necessary for the rigidity of the trunnion guide box 45 which will presently be described. The frame connections for the beam suspension thus far described thereby provides for maintaining the various supporting elements in a vertical plane beneath the longitudinal frame member 10. Means will now be described for maintaining this relationship of the trunnion and rear walking beam while at the same time permitting rocking and vertical motion under the joint action of the springs.

The walking beams 17 on opposite sides of the vehicle are resiliently interconnected by a transverse trunnion guide shaft 22 resiliently mounted at its ends in the tubular trunnions 19. This resilient mounting comprises a pair of spaced tubular rubber trunnion bushings 46 separated by an internal flange 47 in the trunnion tube. The bushings 46 extend slightly beyond the ends of the trunnion tube and are confined between a pair of washers 48 which may be compressed together by means of nuts 49 on the ends of the trunnion guide shaft resiliently to bind the trunnion bushings and the trunnions in predetermined positions on the ends of the shaft. The numeral 50 refers to bulges or flanges on the ends of the trunnion bushings which may be either preformed on the bushings or raised by the compression of the nut 49 to center the trunnion on the bushings. Loosely mounted on the trunnion shaft 22 are a plurality of spacing tubes and washers 51, 52, 53 and 54 to maintain the proper spacing of the trunnion bushings and trunnions on the shaft when the end nuts are tightened. Mounted loosely on the spacing sleeve 53 between the washers 52 is a pair of guide blocks 55 adapted for sliding engagement in the guide box 45.

Each guide box 45 comprises a vertical guide plate 56 having a vertical slot 57 at its lower end receiving the trunnion guide shaft. The vertical edges of the guide plates 56 are welded to a pair of side plates 58 forming a housing for receiving removable guide channels 60 and furnishing the necessary stiffness to the guide box as a whole. There are four channels 60 backed up by the vertical plate 58 on each side of the guide plate 56 to receive the guide blocks 55 as shown in Figure 7. The parts are maintained in assembled relation by a removable bottom plate 59 carrying a pair of rubber cushion elements 61 which limit the downward movement of the trunnion guide shaft. The channels 60 thereby provide bearing surfaces to prevent movement of the trunnion guide shaft in any direction other than vertical and render each guide box effective to resist lateral forces from side sway in both directions, the guide plate 56 being double acting in this respect. In Figure 5 the parts are shown in their no load position, or as they would appear if the frame of the vehicle were jacked up to take the weight off the trunnion. When the vehicle is loaded the trunnion guide shaft 22 would ride in an intermediate portion of the slot 57 with the guide blocks 55 some distance above the bottom cushions 61.

The principal wearing parts in the guide box are the channels 60 and their associated guide blocks 55. These elements are preferably made of dissimilar metals which wear well together, such as bronze and steel, and are all easily removable for convenient replacement. By removing the bottom plate 59 and jacking up the frame of the vehicle, the trunnion shaft and guide channels 60 will drop out of the guide box. The guide blocks 55 may be removed from the trunnion shaft by unscrewing the end nuts 49 and removing the shaft ends from the trunnion bushings. None of the various elements carried by the trunnion guide shaft are permanently attached thereto.

The construction of the resilient shackle 21 is best shown in Figure 8. Connection is made with the walking beam ends 27 and and 30 by means of pins or bolts 65 mounted in rubber bushings 66 in the beam ends. These pins carry a pair of shackle ends 67 and 68 on a resilient, variable length shackle shank having interfitting telescoping tubular elements 69 and 70 slidably associated on opposite sides of a self-lubricating bronze bushing 71. The respective shackle ends include flange plates 72 and 73 constituting opposed spring seats for a coil spring 75 surrounding the tubular elements. An annular plate or washer 76 is welded into the end of the inner tube 69 to form an abutment for engaging an annular leather or rubber pad 77 on the flange plate 73, the abutment and pad thereby limiting the compression of the shackle on overload so that the spring 75 never becomes solid.

The separation of the shackle ends is limited by a flexible cable 80 passing through central openings 81 in the flange plates 72 and 73. One end of the cable is anchored in a flanged abutment 82 and the other end is anchored in a threaded pipe or tube 83. A nut 84 having threaded engagement with the tube 83 provides for adjustment of the effective length of the cable. Both members 82 and 83 are loose in the openings 81.

As previously mentioned, the lever arms of the two beams are proportioned so that the upward force exerted on the shackle 21 by the beam 16 is equal and opposite to the downward force exerted upon the shackle by the beam 17. The lever arm of the axle 14 with respect to the pivotal connection 25 is approximately half the length of the lever arm from the pivot 25 to the lower shackle pin 65, but regardless of the exact value of this ratio the beam 17 should be designed to have the same leverage on its shackle connection. In other words, in the present embodiment the lever arm of the axle 15 with respect to the trunnion 19 is approximately half the length of the lever arm between the trunnion 19 and upper shackle pin 65. When these lever arm ratios are exactly one to two in both cases, the front bracket 18 carries one-half the load on the axle 14 and the spring assembly 20 carries three times as much load, or one and one-half times the load carried by the axle 15, the axles being equally loaded. Taking these ratios into consideration, it is preferable to have the spring 75 relatively soft in comparison to the spring 40 since, like the bracket 18, it supports only one-third the weight carried by spring 40. The spring 75 thereby functions effectively as an auxiliary spring to provide an improved ride for the vehicle.

The present construction is believed to be superior to conventional suspensions because the interplay of the two walking beams through the spring 75 permits the axles 14 and 15 to adjust themselves to ground irregularities and individually to cushion road shocks without calling the main load supporting spring 40 into action, and without changing the height of the supporting trunnion 19. As long as the two walking beams can adjust themselves to road irregularities without raising or lowering the trunnion 19, no shock whatever is transmitted to the vehicle frame even if the spring 40 were considered to be a perfectly rigid connection. When the axles encounter severe road shock the abutment 76 on the shackle end 67 bottoms on the cushion 77 on the shackle end 68 and the shackle then becomes momentarily a rigid shackle connection between the beam ends 27 and 30. However, the shackle still possesses the advantage of being immediately expansible to the limit allowed by the cable 80 to allow either or both axles 14 and 15 to drop again into their original positions without altering the height of the trunnion support 19. The beam ends 27 and 30 are, of course, always free to separate to a limited extent in this manner or under rebound, such action being under the control of spring 75 and connecting cable 80. Conventional auxiliary springs associated with the main load carrying springs ordinarily cannot come into action until the main point of support changes its height with respect to the vehicle frame, which results in the transmission of considerable shock to the frame before the springs have time to yield.

Having now described my invention and in what manner the same may be used, what I claim as new and desire to protect by Letters Patent is:

1. A vehicle suspension comprising a pair of walking beams, an axle carried by each of said beams, a resilient shackle connection between said beams, a trunnion on one of said beams, and a resilient support for said vehicle on said trunnion, said shackle having interfitting relatively slidable members connected to the respective beams and forming a variable length shackle shank resistant to bending to prevent relative lateral movement of the beams.

2. A vehicle suspension comprising a pair of walking beams, an axle cushion seat in each of said beams, a pair of axles resiliently mounted in said cushion seats, a resilient connection between said beams, and a spring and shock absorber assembly supporting said vehicle on one of said beams.

3. A vehicle suspension comprising a first walking beam pivoted at one end to the frame of the vehicle, a second walking beam having a trunnion intermediate its ends, an axle mounted on an intermediate portion of said first walking beam, an axle mounted on an end portion of said second walking beam, a resilient assembly supporting said vehicle on said trunnion, and a compression member interposed between the remaining ends of said beams.

4. A vehicle suspension comprising a first walking beam pivoted at one end to the frame of the vehicle, a second walking beam having a trunnion intermediate its ends, an axle mounted on an intermediate portion of said first walking beam, an axle mounted on an end portion of said second walking beam, a resilient assembly supporting said vehicle on said trunnion, a transverse trunnion shaft resiliently interconnecting the trunnions on opposite sides of the vehicle, guide means adjacent said trunnions receiving and guiding said trunnion shaft in vertical movement, and a compression coil spring interposed between the remaining ends of said beams.

5. A vehicle suspension comprising a first walking beam pivoted at one end to the frame of the vehicle, a second walking beam having a trunnion intermediate its ends, an axle mounted on an intermediate portion of said first walking beam, an axle mounted on an end portion of said second walking beam, the remaining end of said first walking beam being downwardly offset and the remaining end of said second walking beam being upwardly offset directly thereabove, a compression spring interposed between said offset ends and interconnecting said two beams, and a resilient assembly supporting said vehicle on said trunnion.

6. In a vehicle suspension, a pair of axle carrying members arranged for coordinate and independent movement, a pair of shackle ends pivotally connected to said members, interfitting sliding members on said shackle ends providing a variable length shackle shank resistant to bending, a compression spring interposed between said shackle ends, and means for limiting the separation of said ends.

7. In a vehicle suspension, a pair of suspension members mounted and arranged for relative movement, a pair of shackle ends pivotally connected to said members, a pair of telescopically slidable interfitting tubular members carried by said shackle ends providing a variable length shackle shank, a compression spring interposed between said shackle ends and surrounding said shank, and a cable within said tubular members to limit the separation thereof.

8. In a vehicle suspension, a pair of longitudinal walking beams, each of said beams carrying an axle, a resilient shackle interconnecting said beams to provide relative movement therebetween for absorbing road shock, said shackle having interfitting relatively slidable members connected to the respective beams and forming a variable length shackle shank resistant to bending to prevent relative lateral movement of the beams, and a spring assembly supporting the frame of said vehicle on one of said beams and absorbing road shock not absorbed by the interplay between the beams through said shackle.

9. In a vehicle suspension, a pair of walking beams each carrying an axle, a resilient shackle interconnected between said beams to allow coordinate and independent interplay therebetween to thereby absorb road shock before it is transmitted to members connected with the vehicle frame, said shackle having interfitting relatively slidable members connected to the respective beams and forming a variable length shackle shank resistant to bending to prevent relative lateral movement of the beams, and a resilient assembly connected with the vehicle frame for supporting the vehicle on one of said beams.

10. In a vehicle suspension, a pair of walking beams each carrying an axle, a main load supporting spring assembly supporting the vehicle on one of said walking beams, and a resilient shackle interconnecting said beams to allow interplay therebetween to absorb a substantial amount of road shock before it is transmitted to said main load supporting spring assembly, said shackle having interfitting relatively slidable members connected to the respective beams and forming a variable length shackle shank resistant to bending to hold the beams in alignment in a common vertical plane.

11. In a vehicle suspension, a pair of longitudinal walking beams each carrying an axle, a trunnion on one of said walking beams, a resilient assembly supporting said vehicle on said trunnion, and a resilient shackle interconnecting said beams to allow interplay therebetween to absorb a substantial amount of road shock without disturbing the height of said supporting trunnion.

12. In a vehicle suspension, a walking beam, a trunnion on said walking beam, a resilient assembly supporting said vehicle on said trunnion, said resilient assembly including a guide box adjacent said trunnion, a vertical guide plate in said guide box, a transverse trunnion shaft carried by said trunnion, and a pair of spaced guide blocks on said shaft engaging opposite sides of said vertical guide plate in vertical sliding movement under the action of said resilient assembly.

13. In a vehicle suspension, a walking beam, a trunnion on said walking beam, a resilient assembly supporting said vehicle on said trunnion, said resilient assembly including a guide box adjacent said trunnion, a vertical guide plate in said guide box, a vertical slot in said guide plate, removable channel members on opposite sides of said plate adjacent said slot, a transverse trunnion shaft carried by said trunnion and received in said slot, and a pair of removable spaced guide blocks on said shaft vertically slidable in said channels to guide said trunnion in vertical movement.

14. In a vehicle suspension, a pair of walking beams on opposite sides of the vehicle, tubular trunnions on said walking beams, resilient assemblies supporting said vehicle on said trunnions, vertical guide boxes associated with said resilient assemblies, a transverse trunnion shaft interconnecting the trunnions on opposite sides of the vehicle, pairs of guide blocks on each end of said shaft vertically slidable in said guide boxes, a central spacing tube on said shaft spacing said pairs of guide blocks, resilient trunnion bushings on said shaft within said trunnions, spacer tubes on said shaft between said bushings and said pairs of guide blocks, and means on the ends of said shaft for compressing said trunnion bushings against said spacer tubes in series, all of said elements being unattached to said shaft and freely removable therefrom upon removal of said means.

15. In a vehicle suspension, a pair of walking beams on opposite sides of the vehicle, tubular trunnions on said walking beams, spring assemblies supporting said vehicle on said trunnions, vertical guide boxes associated with said spring assemblies, a transverse trunnion shaft interconnecting the trunnions on opposite sides of the vehicle, resilient trunnion bushings on said shaft within said trunnions, a short spacing tube near each end of said shaft and received in one of said guide boxes, washers on said shaft at the ends of said spacing tubes, a pair of guide blocks confined between said washers on each of said spacing tubes, each pair of guide blocks being slidable in one of said guide boxes, a central spacing tube on said shaft between the innermost of said washers, outer spacing tubes on said shaft between the outer washers and said trunnion bushings, and means on the ends of said shaft for compressing said bushings and releasably retaining all of said elements on said shaft.

ROBERT W. POINTER.

REFERENCES CITED

The following references are of record in the file of this patent:

UNITED STATES PATENTS

| Number | Name | Date |
| --- | --- | --- |
| 2,049,963 | Lancia | Aug. 4, 1936 |
| 2,110,214 | Flowers | Mar. 8, 1938 |
| 2,263,525 | Stewart | Nov. 18, 1941 |
| 2,301,742 | Muller | Nov. 10, 1942 |
| 2,324,657 | Wales | July 20, 1943 |
| 2,361,496 | Pointer | Oct. 31, 1944 |